May 26, 1925.

V. W. PAGÉ

1,539,764

VEHICLE BODY CONSTRUCTION

Filed April 17, 1923

WITNESSES

INVENTOR
VICTOR W. PAGÉ

BY

ATTORNEYS

Patented May 26, 1925.

1,539,764

UNITED STATES PATENT OFFICE.

VICTOR W. PAGÉ, OF STAMFORD, CONNECTICUT.

VEHICLE-BODY CONSTRUCTION.

Application filed April 17, 1923. Serial No. 632,700,

*To all whom it may concern:*

Be it known that I, VICTOR W. PAGÉ, a citizen of the United States, and a resident of Stamford, in the county of Fairfield and State of Connecticut, have invented a new and Improved Vehicle-Body Construction, of which the following is a full, clear, and exact description.

The present invention relates to new and useful improvements in vehicle bodies and it pertains more particularly to a tonneau seat construction for motor vehicles.

It is one of the primary objects of the invention to provide a seat which can be moved from its normal operating position within the tonneau to a point to the rear of the tonneau to leave the tonneau space clear for the purpose of carrying various articles, such as baggage or the like.

It is a further object of the invention to construct the tonneau so that a storage compartment is had regardless of the position of the seat with respect to the tonneau.

It is a further object of the invention to construct this storage compartment so that it may be accessible either from the rear or from the front of the compartment.

It is a still further object of the invention to construct the tonneau so that the opening through which access is had to the compartment at the front thereof, is normally closed by the back of the seat.

With the above and other objects in view, reference is had to the accompanying drawings, in which—

Figure 1:
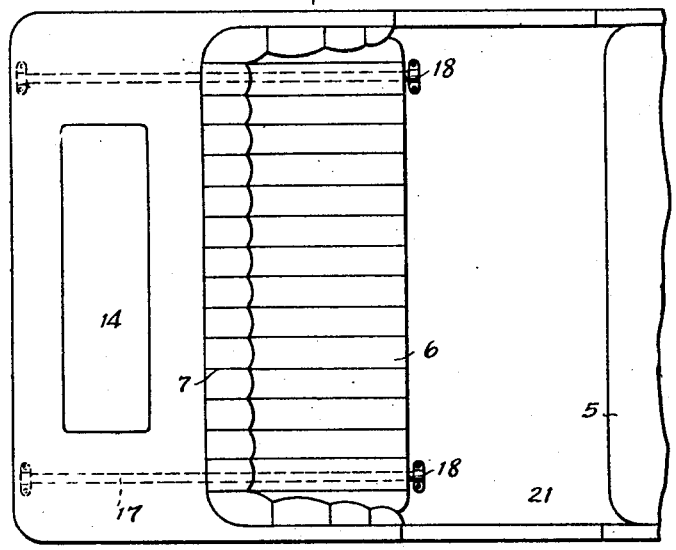
Figure 1 is a top plan view of a vehicle body constructed in accordance with the present invention.

Referring more particularly to the drawings, the reference character 5 designates the front seat; 6 designates the rear seat, and 7 designates the back rest of the rear seat 6.

The reference character 8 designates the tonneau space and behind the space there is a rearwardly and downwardly curved wall 9 forming the rear end of the vehicle body. Depending from the forward end of this downwardly curved rear wall 9, is a partition 10, and said partition 10 has an opening 11 therein. Arranged horizontally in this space is a partition 12, and said partitions 10 and 12 and the downwardly curved wall 9 form a compartment 13 for the storage of tools or other articles. Access to this compartment is had from the rear by means of a tool 14 or the like.

The back rest 7 of the seat 6 is hingedly mounted as at 15, and is adapted to swing upwardly about its hinge as a pivot point. This back rest 7 provides means for closing the opening 11 in the partition 10 and thus when the seat is swung upwardly, access to the compartment 13 may be had through the opening 11. The back rest 7 is swung about its pivotal point by means of a strap or fingerpiece 7', which is secured to the bottom edge thereof.

The seat 6 is carried by a seat frame 16, and said seat frame 16 is slidably mounted on guides 17 carried by brackets 18 or the like. The seat frame 16 is hollow to provide a compartment 19 to which access is had by means of the opening 20 in the top of the seat frame when the seat 6 is removed therefrom. It is to be noted that the brackets 18 which carry the guides and the guides 17 are mounted on opposite sides of the body and are preferably secured to the floor 21 of the vehicle in any desired manner.

Figure 2:
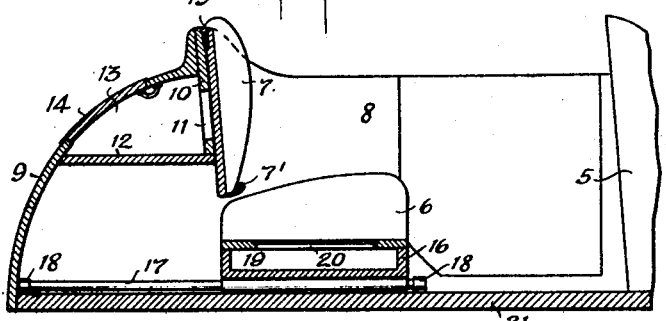
Fig. 2 is a longitudinal sectional view showing the seat in its operative position.
Figure 3:
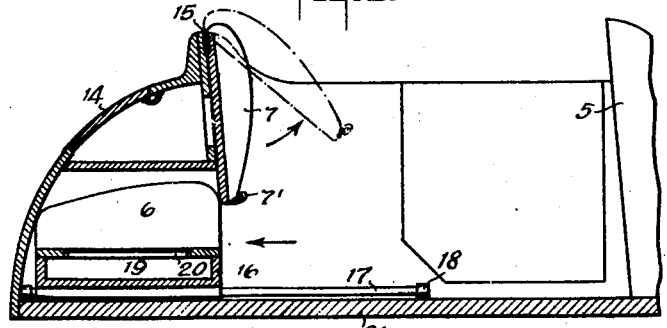
Fig. 3 is a similar view showing the seat in its inoperative position leaving the tonneau space or compartment clear for the reception of baggage or other articles.

When it is desired to use the tonneau compartment for passengers, the seat 6 is positioned as shown in Fig. 2, that is, in its forward position on the guides 17. When, however, it is desired to use the tonneau compartment for the purpose of carrying baggage or other articles, the back rest 7 is swung about its pivotal point and the seat 6 is slid rearwardly to the position shown in Fig. 3, after which the back rest 7 is dropped as shown and serves to maintain the seat 6 in its rear position thus leaving the tonneau space unobstructed.

From the foregoing it is apparent that the present invention provides a new and improved form of body for vehicles by the use of which the tonneau compartment may be employed for carrying passengers or baggage, merchandise, and the like, and that by this construction a space ordinarily occupied by the tonneau seat is available for use when passengers are not being carried and the tonneau is used for other purposes.

What is claimed is:

In a vehicle body, a tonneau compartment, said body being extended beyond the tonneau compartment to provide a space at the rear thereof, a horizontally disposed partition dividing the space at the rear of the tonneau compartment into an upper and a lower compartment, a swinging seat back closing the front of the upper compartment and giving access thereto from the tonneau compartment, a plurality of guides extending from the tonneau compartment into the lower compartment of the space at the rear of the tonneau compartment, and a seat slidably mounted on said guides and movable from the tonneau compartment into the lower compartment of the space at the rear thereof.

VICTOR W. PAGÉ.